US00RE40858E

(19) United States
(12) Reissued Patent
Gallant et al.

(10) Patent Number: US RE40,858 E
(45) Date of Reissued Patent: Jul. 21, 2009

(54) FASTENER ELEMENT MOLDING

(75) Inventors: Christopher M. Gallant, Nottingham, NH (US); Stephen C. Jens, Waltham, MA (US); Andrew C. Harvey, Waltham, MA (US); Richard M. Formato, Grafton, MA (US)

(73) Assignee: Velcro Industries B.V., Curacao (AN)

(21) Appl. No.: 11/438,745

(22) Filed: May 22, 2006

Related U.S. Patent Documents

Reissue of:
(64) Patent No.: 6,930,277
Issued: Aug. 16, 2005
Appl. No.: 10/154,539
Filed: May 24, 2002

U.S. Applications:
(63) Continuation-in-part of application No. 09/341,908, filed as application No. PCT/US98/01053 on Jan. 20, 1998, now Pat. No. 6,533,981, which is a continuation-in-part of application No. 08/926,517, filed on Sep. 10, 1997, now Pat. No. 6,039,556, which is a continuation-in-part of application No. 08/786,226, filed on Jan. 21, 1997, now Pat. No. 5,971,738.

(51) Int. Cl.
*B23K 26/00* (2006.01)

(52) U.S. Cl. ..... 219/121.72; 493/212
(58) Field of Classification Search ..... 219/219, 219/121.67, 121.72, 121.85, 121.6; 493/212–214
See application file for complete search history.

(56) References Cited

U.S. PATENT DOCUMENTS 973,380 A * 10/1910 Parker ..... 29/404
3,027,595 A * 4/1962 Ishiyama et al. ..... 264/284
3,031,730 A * 5/1962 Morin ..... 24/444
3,089,191 A * 5/1963 Conrad ..... 425/383

(Continued)

FOREIGN PATENT DOCUMENTS

EP 0709038 5/1996
EP 1042971 A * 10/2000

(Continued)

OTHER PUBLICATIONS

International Search Report.

*Primary Examiner*—Robert J Sandy
(74) *Attorney, Agent, or Firm*—Fish & Richardson P.C.

(57) ABSTRACT

A method of forming a mold having cavities for molding loop-engageable, hook-shaped fastener elements, includes: supporting a first plate having an outer surface that defines a plane; manipulating a material-cutting beam of a laser along a predetermined curved profile to cut a cavity into the outer surface of the first plate, the predetermined curved profile being generally hook-shaped, the cavity defined by a wall extending into the first plate from the outer surface; in a series of subsequent actions, repeatedly indexing the first plate relative to the laser to direct the material-cutting beam at further positions on the first plate and repeating the step of manipulating the material-cutting beam of the laser relative to the first plate to form a series of cavities, each having a hook-shaped profile; and positioning a second plate adjacent the outer surface of the first plate, the second plate providing a side wall surface for each of the cavities of the first plate, the first plate and the second plate in combination forming a mold having cavities for molding loop-engageable, hook-shaped fastener elements. Various methods for aligning such mold plates in a fastener element molding apparatus are also provided. A hook product includes a stem portion integrally molded with and extending from a sheet-form base to a distal end, the stem portion having a planar side; and a crook portion extending from the distal end of the stem portion to overhang the sheet-form base in an overhang direction, the crook portion having a flat planar side co-planar with the planar side of the stem, and an upper surface extending upward from an upper extent of the planar side of the crook portion to an apex.

19 Claims, 14 Drawing Sheets

U.S. PATENT DOCUMENTS 3,136,026 A * 6/1964 Mestral ..... 28/161
3,261,069 A * 7/1966 Mathison ..... 24/450
3,312,583 A * 4/1967 Rochlis ..... 428/88
3,408,705 A * 11/1968 Kayser et al. ..... 24/452
3,555,601 A * 1/1971 Price ..... 425/327
3,752,619 A * 8/1973 Menzin et al. ..... 425/134
3,907,486 A * 9/1975 Kennedy ..... 425/471
4,261,692 A * 4/1981 Kuby ..... 425/194
4,573,893 A * 3/1986 Waters et al. ..... 425/71
4,587,700 A * 5/1986 Curbishley et al. ..... 29/889.2
4,725,221 A * 2/1988 Blanz ..... 425/575
4,775,310 A * 10/1988 Fischer ..... 425/308
4,794,028 A * 12/1988 Fischer ..... 428/100
4,872,243 A * 10/1989 Fischer ..... 24/442
4,894,060 A * 1/1990 Nestegard ..... 604/391
4,984,339 A * 1/1991 Provost et al. ..... 24/452
5,031,483 A * 7/1991 Weaver ..... 76/107.1
5,038,469 A * 8/1991 Masuda et al. ..... 29/895.213
5,064,537 A * 11/1991 Chupka et al. ..... 210/497.01
5,131,119 A * 7/1992 Murasaki et al. ..... 24/452
5,174,937 A * 12/1992 Tamura et al. ..... 264/106
5,326,612 A * 7/1994 Goulait ..... 428/100
5,339,499 A * 8/1994 Kennedy et al. ..... 24/452
5,361,462 A * 11/1994 Murasaki ..... 24/452
5,580,466 A * 12/1996 Tada et al. ..... 29/827
5,688,418 A * 11/1997 Yoshiyasu et al. ..... 219/121.71
5,705,254 A * 1/1998 Morinaga et al. ..... 428/141
5,792,411 A * 8/1998 Morris et al. ..... 264/400
5,884,374 A * 3/1999 Clune ..... 24/446
5,971,738 A * 10/1999 Jens et al. ..... 425/194
6,039,556 A 3/2000 Jens et al.
6,051,103 A * 4/2000 Aikawa ..... 162/55
6,061,881 A 5/2000 Takizawa et al.
6,083,411 A * 7/2000 Nakayama et al. ..... 216/27
6,163,939 A 12/2000 Lacey et al.
6,190,594 B1 * 2/2001 Gorman et al. ..... 264/167
6,287,665 B1 * 9/2001 Hammer ..... 428/100
6,433,303 B1 * 8/2002 Liu et al. ..... 219/121.7
6,489,003 B1 * 12/2002 Levitt et al. ..... 428/100

FOREIGN PATENT DOCUMENTS

EP 1616656 2/2006
FR 2801177 5/2001
JP 10201382 * 8/1998
JP 10202382 * 8/1998
WO WO 94/29070 * 12/1994
WO WO 95/01863 * 1/1995
WO WO 98/33131 * 7/1998
WO WO 0015069 3/2000

* cited by examiner

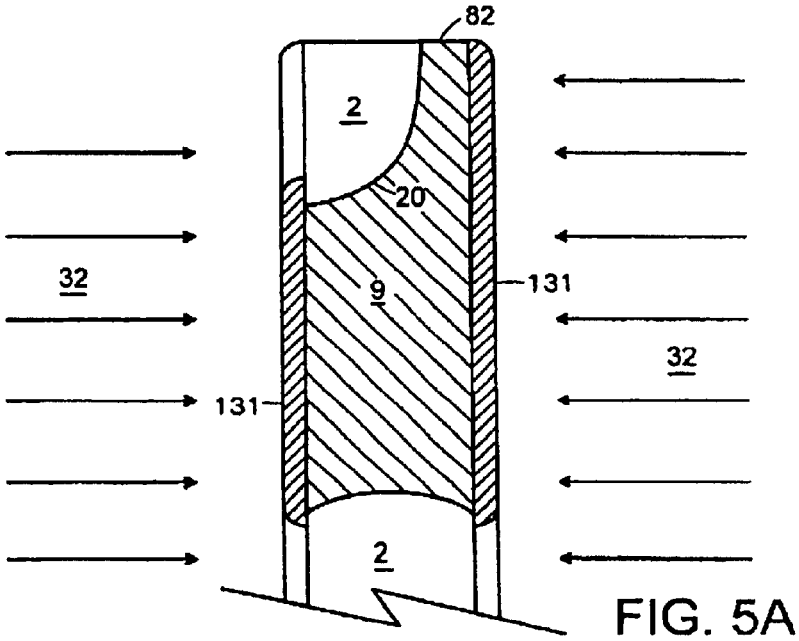
FIG. 5A
FIG. 5B
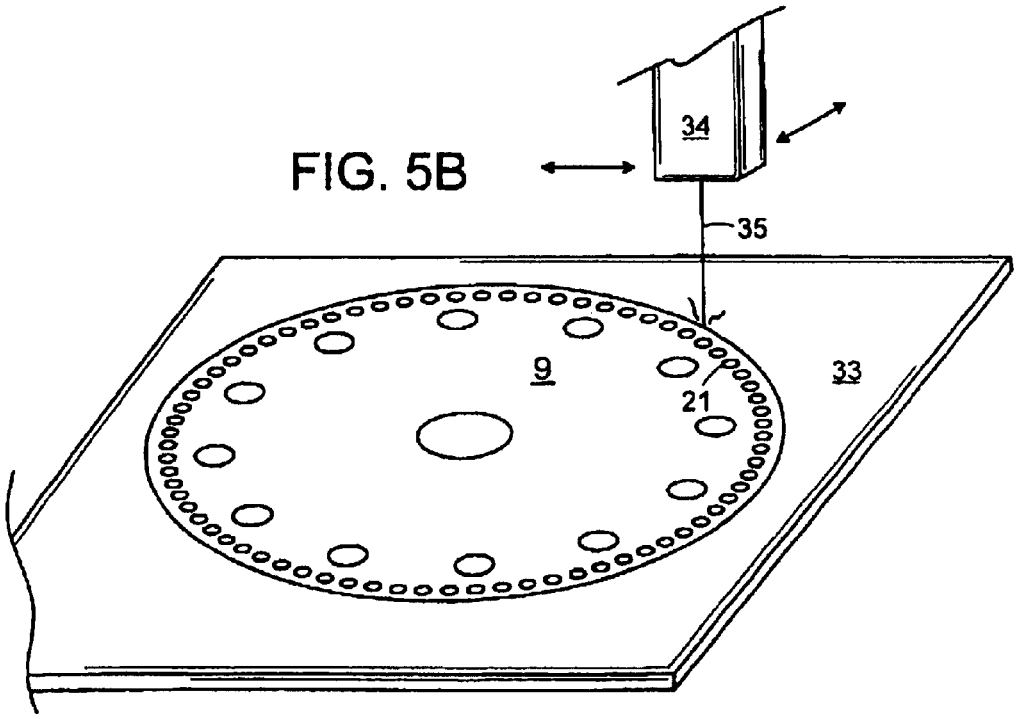

FASTENER ELEMENT MOLDING

Matter enclosed in heavy brackets [ ] appears in the original patent but forms no part of this reissue specification; matter printed in italics indicates the additions made by reissue.

CROSS REFERENCE TO RELATED APPLICATIONS

[This application is a continuation-in-part of U.S. Ser. No. 09/341,908, filed May 8, 2002, now U.S. Pat. No. 6,533,981 which claims priority through PCT Application No. US98/01053, filed Jan. 20, 1998, from U.S. Continuation-in-Part application Ser. No. 08/926,517, filed Sep. 10, 1997, which issued as U.S. Pat. No. 6,039,556 on Mar. 21, 2000.] *Continuation-in-part of U.S. Ser. No. 09/341,908, filed as application No. PCT/US98/01053 on Jan. 20, 1998, now U.S. Pat. No. 6,533,981, which is a continuation-in-part of application Ser. No. 08/926,517, filed on Sep. 10, 1997, now U.S. Pat. No. 6,039,556, which is a continuation-in-part of application Ser. No. 08/786,226, filed on Jan. 21, 1997, now U.S. Pat. No. 5,971,738.*

TECHNICAL FIELD

This invention relates to molding features that are integral with a base, and has particular application to the production of fastener elements for touch fasteners and the like.

BACKGROUND

Hook elements for hook-and-loop touch fasteners and other products are effectively produced by the machine and method of Fischer U.S. Pat. No. 4,794,028. In commercial production, a mold roll is formed by a large number of thin, disk-shaped mold rings (sometimes called mold plates) and spacer rings which are stacked concentrically about a central barrel.

Discrete products are also injection molded with fastener elements extending from a base surface by employing, as part of the mold, a series of stacked mold plates defining an array of mold cavities.

At the periphery of the mold rings or mold plates are cavities for molding the hook elements. In current production machines each cavity of a mold ring has been formed, one at a time, by wire electro-discharge machining (EDM). In the wire EDM process, an electrical discharge between a wire and the plate removes material from the plate while the wire is moved along a specified path to cut a profile through the mold plate. The minimum radius arc that can be cut is determined by the radius of the EDM wire.

Molten resin is forced into the mold cavities, tending to raise the temperature of the mold rings. In practice of the Fischer method, a fluid coolant is circulated through cooling passages within the barrel on which the rings are mounted to remove the heat from the rings.

In this way an appropriate temperature of the mold cavities is maintained so that the product becomes sufficiently solid that it can be withdrawn on a continuous basis, typically without opening the mold cavities.

SUMMARY

In one aspect, the invention provides a method of forming a mold having cavities for molding loop-engageable, hook-shaped fastener elements. The method includes: supporting a first plate having an outer surface that defines a plane; manipulating a material-cutting beam of a laser along a predetermined curved profile to cut a cavity into the outer surface of the first plate, the predetermined curved profile being generally hook-shaped, the cavity defined by a wall extending into the first plate from the outer surface; in a series of subsequent actions, repeatedly indexing the first plate relative to the laser to direct the material-cutting beam at further positions on the first plate and repeating the step of manipulating the material-cutting beam of the laser relative to the first plate to form a series of cavities, each having a hook-shaped profile; and positioning a second plate adjacent the outer surface of the first plate, the second plate providing a side wall surface for each of the cavities of the first plate, the first plate and the second plate in combination forming a mold having cavities for molding loop-engageable, hook-shaped fastener elements.

Variations of this aspect of the invention can include one or more of the following features. The step of manipulating a material-cutting beam of a laser to cut a cavity includes positioning the material-cutting beam at an acute angle relative to the plane defined by the upper surface of the first plate to form at least a portion of the wall defining the cavity at a corresponding acute angle relative to the plane. The step of manipulating the material-cutting beam of the laser to cut the cavity includes cutting only partially through the first plate, a remaining portion of the first plate providing a second side surface of the cavity, opposite the side surface formed by the second plate. The method further includes a step of forming a series of cavities on the second plate, the cavities of the second plate being of mirror image relative to the cavities of the first plate, the step of positioning the second plate adjacent the outer surface of the first plate including aligning the cavities of the first plate with the cavities of the second plate to form a series of hook-shaped cavities, each having one side surface formed by a remaining portion of the second plate and an opposite side surface formed by a remaining portion of the first plate. The second plate has opposite planar surfaces, the method further includes a step of forming a series of cavities extending into the second plate from one of the opposite planar surfaces, the step of positioning the second plate adjacent the outer surface of the first plate including aligning a non-cavitated portion of one of the opposite planar surfaces of the second plate with each of the cavities of the first plate, the second plate providing a planar side wall for each of the cavities of the first plate. The step of manipulating a metal-cutting beam of a laser to cut a cavity includes cutting completely through the first plate, the wall of the cavity extending from the outer surface of the first plate to an opposite outer surface of the first plate, the method further including a step of positioning a third plate adjacent the opposite outer surface of the first plate, the second plate and the third plates defining opposite side surfaces of each of the cavities. The series of mold cavities is arranged on a circular periphery to define a mold ring.

In another aspect, the invention provides a method of forming a mold plate for forming at least a portion of an adjacent series of hook-defining mold cavities, the mold plate provided for assembly with additional plates to form a molding apparatus for molding a fastener member having loop-engaging hook fastener elements extending from a base. The method includes: supporting a metal plate to expose a planar outer surface of the metal plate; controllably directing a metal-cutting beam of a laser along a predetermined path to cut the metal plate to form the mold plate, the pre-determined path requiring the metal-cutting beam to cut completely through a portion of the metal plate to define a peripheral edge surface of the mold plate for molding a portion of the base of the fastener member, the predetermined path further requiring the metal-cutting beam to cut into the planar upper surface of the metal plate at predetermined intervals to define a series of cavities in the mold plate for forming the loop-engageable hook fastener elements of the fastener member, each of the cavities being defined by a wall extending into the mold plate from the planar upper surface and extending into the mold plate from the peripheral edge surface.

Variations of this aspect of the invention can include one or more of the following features. The metal-cutting beam is controllably directed to cut the metal plate so that at least a portion of the wall of each of the series of cavities forms an acute angle relative to the planar outer surface. The metal-cutting beam is controllably directed to cut the metal plate so that each of the series of cavities is defined by a wall extending from the planar outer surface completely through to an opposite outer surface of the metal plate.

In another aspect, the invention provides a method of forming a fastener member having a plurality of loop-engaging fastener elements extending from a base. The method includes: (a) providing a metal plate having a planar surface; (b) cutting the metal plate with a beam of energy from a laser to form a mold ring having a peripheral edge surface, the beam of energy articulated in a pre-determined manner along a curved path to form a series of cavities in the mold ring, each cavity of the series having a wall formed by the beam of energy that extends inwardly from the peripheral edge surface and extends inwardly from the planar surface of the mold ring; (c) repeating steps (a) and (b) to form a plurality of mold rings; (d) assembling the plurality of mold rings in a stack-form to provide a molding apparatus with an exposed outer surface including the peripheral edge surface of each mold ring and the series of cavities extending inwardly therefrom; (e) introducing molten thermoplastic resin onto the exposed outer surface of the molding apparatus and into the series of cavities, the peripheral edge surfaces shaping the thermoplastic resin to form a surface of the base of the fastener member, the series of cavities shaping the thermoplastic resin to form the plurality of loop-engaging fastener elements of the fastener member extending from the base; and (f) removing the thermoplastic resin in an at least partially solidified state from the molding apparatus to provide the fastener member.

Variations of this aspect of the invention can include one or more of the following features. The step of assembling the mold plates further includes providing additional flat plates adjacent the mold rings in the stack-form of the molding apparatus, the additional flat plates forming at least one side of some of the plurality of the loop-engaging fastener elements of the fastener member. At least one of the mold rings has laser cut cavities that are a mirror image of the cavities of another of the mold rings, the one and the another of the mold rings assembled adjacent each other in the molding apparatus so that their respective cavities mate to form opposite sides of a loop-engaging fastener when filled with thermoplastic resin. The step of cutting the metal plate with a beam of energy from a laser to form a mold ring further includes controllably directing the beam of energy of the laser to cut the metal plate to define the peripheral edge surface of the mold ring. The step of cutting the metal plate with a beam of energy from a laser to form a mold ring further includes controllably directing the beam of energy of the laser to cut the metal plate to define an alignment hole in the mold ring. The step of assembling the mold rings in a stack-form to provide a molding apparatus further includes: providing an alignment shell defining a circular aligning surface, and at least one aligning bar; and arranging the rings in the stack-form with each ring being supported on its outer circumferential surface by the aligning surface, the aligning bar extending through a the aligning hole in each mold ring.

In yet another aspect, the invention provides a method of aligning a multiplicity of thin, disk-shaped mold rings, each having an array of aligning holes and an outer circumferential surface, to form a mold roll. The method includes: providing an alignment shell defining a circular aligning surface, and at least one aligning bar; stacking the rings together to form a stack, each ring being supported on its outer circumferential surface by the aligning surface, with the aligning bar extending through a the aligning hole in each ring; axially compressing the stack of rings to maintain the radial alignment provided by the circular aligning surface; and removing the aligned stack of rings from the alignment shell.

Variations of this aspect of the invention can include one or more of the following features. The mold plates are round and the step of forming includes laser-cutting the outer edges of the mold plates. The step of stacking includes axially stacking the round mold plates to form a mold roll.

In another aspect, the invention provides a hook product for a hook and loop fastening system, the hook product including a plurality of hooks extending from a common sheet-form base. Each of the hooks has a stem portion and a crook portion. The stem portion is integrally molded with and extends from the sheet-form base to a distal end, and has a planar side. The crook portion extends from the distal end of the stem portion to overhang the sheet-form base in an overhang direction. The crook portion has a flat planar side coplanar with the planar side of the stem, and an upper surface extending upward from an tipper extent of the planar side of the crook portion to an apex.

Preferably, the upper surface extends at an angle of at least 30 degrees with respect to the base, at the uppermost region of the crook portion.

Preferably, the flat planar side of the crook portion has a width, at the uppermost region of the crook portion, of at least 50 percent of the overall width of the hook.

In some cases, the crook portion also includes an opposite side, the apex being located at one of the sides of the crook portion.

In some embodiments, the crook portion further includes a second upper surface extending from the second side of the crook portion to the apex, which may be located between the first and second sides of the crook portion.

In some examples, the crook portion also has a first lower surface that, in a cross-section taken perpendicular to the base and the first side surface through an uppermost region of an underside of the crook portion, extends downward from the first side surface of the crook portion. In some cases, the crook portion also has a second lower surface that, in the same cross-section, extends downward from the second side surface of the crook portion to intersect the first lower surface.

Preferably, the upper surface extends at an angle of at least 30 degrees with respect to the base, at the uppermost region of the crook portion.

Preferably, the flat planar side of the crook portion has a width, at the uppermost region of the crook portion, of at least 50 percent of the overall width of the hook.

The invention provides an advantageous hook product and advantages in the design and manufacture of fastening elements and hooks of such products by allowing great design flexibility in selecting and producing cavity shapes for forming such fastening elements. This design flexibility allows for the manufacture of fastening elements that are particularly well-suited for their intended applications because the base, stem and engaging head, or crook, design of such fastening elements can be specifically tailored to accommodate expected strength and/or engageability requirements, such as, for example, those presented by low-loft, nonwoven mating loop materials.

The invention further provides advantages in the manufacture of fastening elements by providing greater precision and accuracy in the construction and assembly of the various pieces that form the molding apparatus from which such fastening elements are manufactured. These construction and assembly advances provide for efficiency and reliability gains in the manufacture of fastening products.

The details of one or more embodiments of the invention are set forth in the accompanying drawings and the description below. Other features, objects, and advantages of the invention will be apparent from the description and drawings, and from the claims.

DESCRIPTION OF DRAWINGS

FIGS. 5A through 5D illustrate preferred methods of mold ring manufacture;

FIGS. 10B-10E are cross-sectional views taken along respective lines in FIG. 10.

Like reference symbols in the various drawings indicate like elements.

DETAILED DESCRIPTION

FIGS. 1-4 illustrate equipment useful for the continuous molding of synthetic resin to produce features that are integral with a base sheet, having particular application to the production of fastener elements for touch fasteners and the like.

Figure 1:
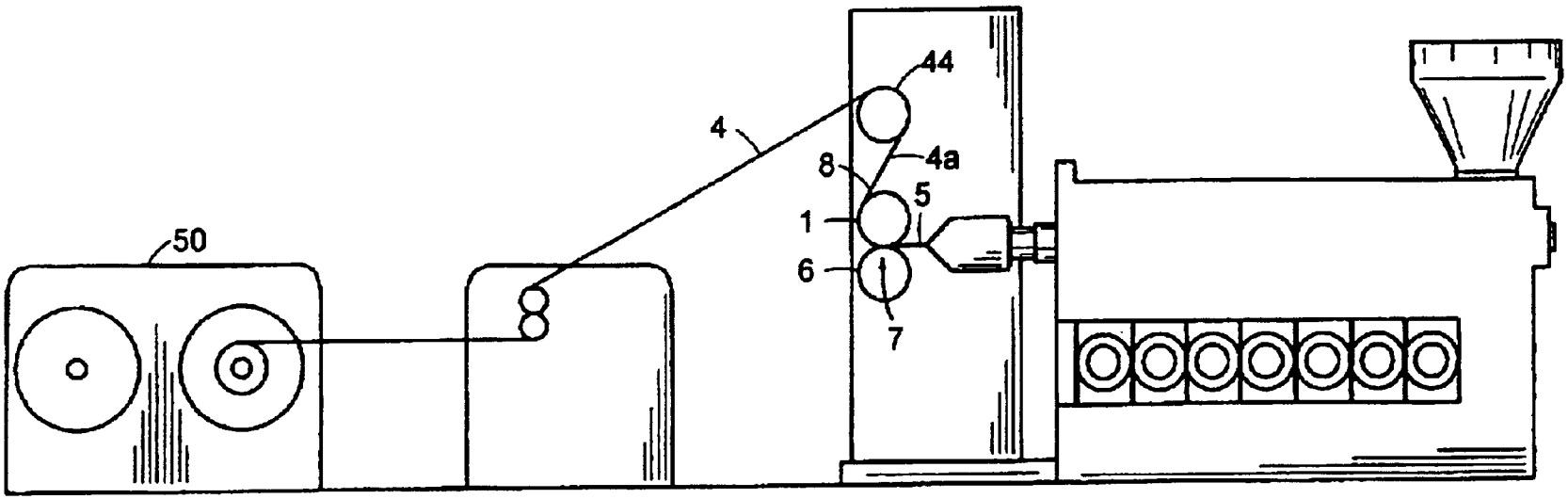
FIG. 1 is a schematic representation of a molding system employing a mold roll.
Figure 2:
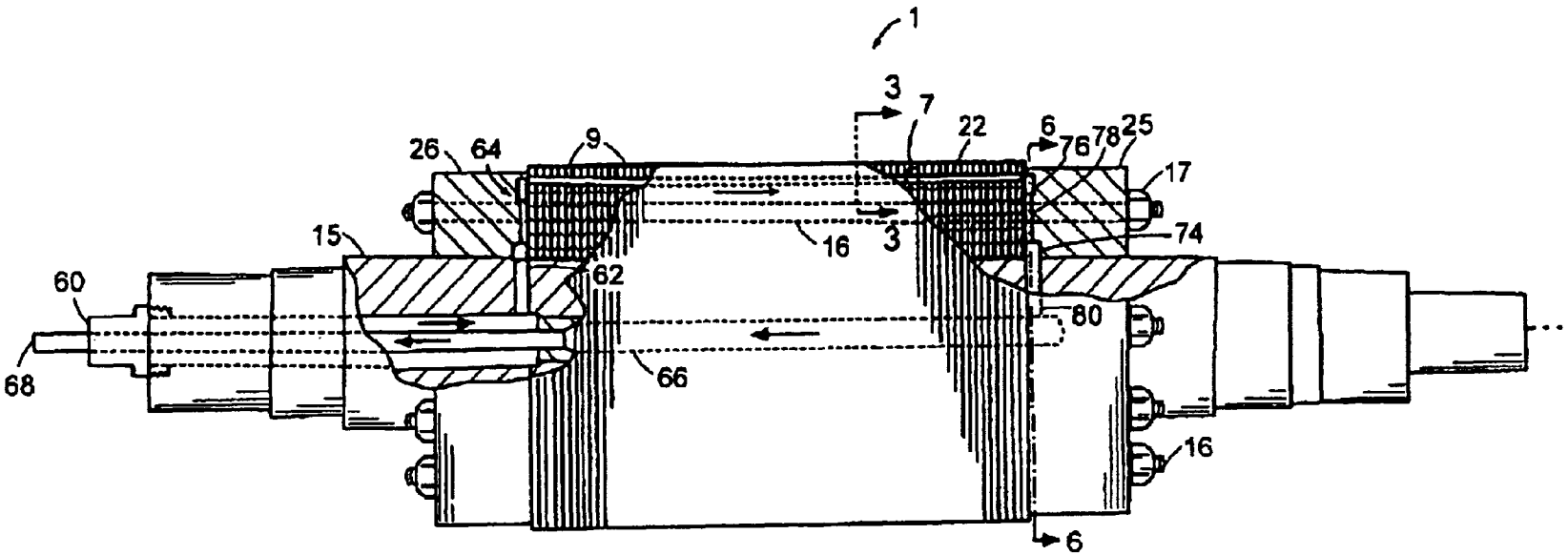
FIG. 2 is a fragmentary view of a mold roll, according to the invention.

FIG. 1 shows a molding system using the molding roll for the production of hook elements for touch fastener products. The process and basic machine shown are in accordance with the Fischer techniques as described in U.S. Pat. Nos. 4,775,310, 4,794,028 and 4,872,243, which are hereby incorporated by reference as if they were fully set forth.

The mold roll 1 has miniature hook form mold cavities around its periphery for forming hook projections on an extruded strip-form touch fastener product 4. Mold roll 1 comprises many annular, thin mold rings, for instance of 0.006 to 0.020 inch thickness, held together as a stack. Heat-softened synthetic resin 5 is forced into the cavities under pressure. In a continuous process, the hook-form projections at least partially solidfy in the mold cavities, and are then pulled out of the cavities in area 8 after the product has cooled to a temperature at which the projections have solidified sufficiently to be pulled intact out of their mold cavities, remaining integral with the base sheet of the product. The projections are pulled out of mold roll 1 by passing the product around an idler roll 44, and from there to the takeup assembly 50.

In the present invention, the individual mold rings 9 of mold roll 1 are aligned and stacked axially around a common shaft 15. Rings 9 are held together under axial compression by an array of tie rods 16 extending through aligned holes in the stack of rings, running parallel to shaft 15 and tensioned by threaded nuts 17 at each end.

An array of many coolant passages 22 pass through mold roll 1 near the periphery of mold rings 9 for improved cooling of the mold cavities at the periphery of the mold roll. In one configuration, cooling fluid is pumped into the mold roll through an annular inlet 60 in shaft 15, and passes through shaft holes 62 and passages 64 of an inlet manifold 26. From the inlet manifold, the coolant passes through the mold roll along cooling passages 22 to an outlet manifold 25 at the other end of the mold roll, which also has passages 64 to direct the coolant through shaft holes 65 and a return passage 66 in shaft 15, to outlet 68.

Figure 3:
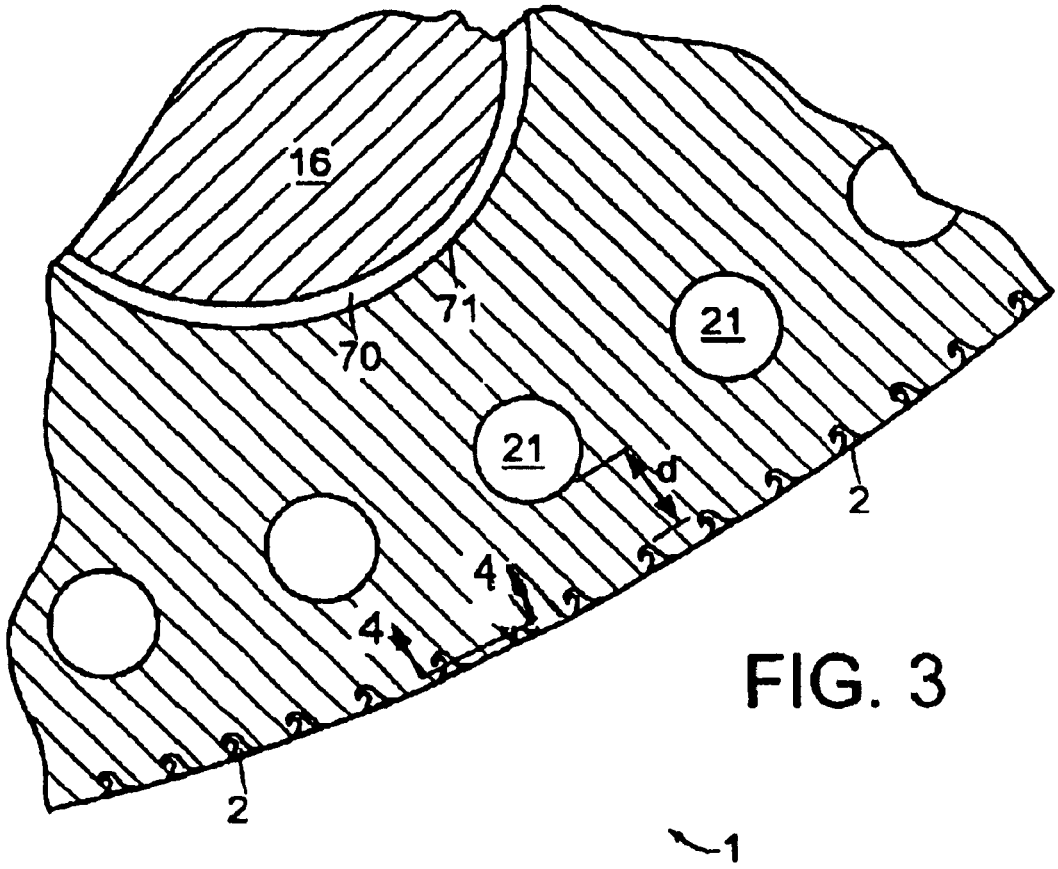
FIG. 3 is an enlarged cross-sectional view, taken along line 3—3 in FIG. 2.

Referring to FIG. 3, the mold cavities 2 near the periphery of hold roll 1 are shaped to form fastener elements integral to a base sheet. These mold cavities 2 form features of about 0.005 to 0.100 inch in height, and on the order of 0.005 to 0.100 inch wide. For improved cooling, coolant holes 21 are in close proximity to mold cavities 2, within a distance d of, for instance, 0.2 inch. Also visible in this view is a gap 70 between tie rod 16 and the wall of an associated hole 71 through the mold roll. This gap enables improved mold ring alignment, as will be discussed later.

Figure 4:
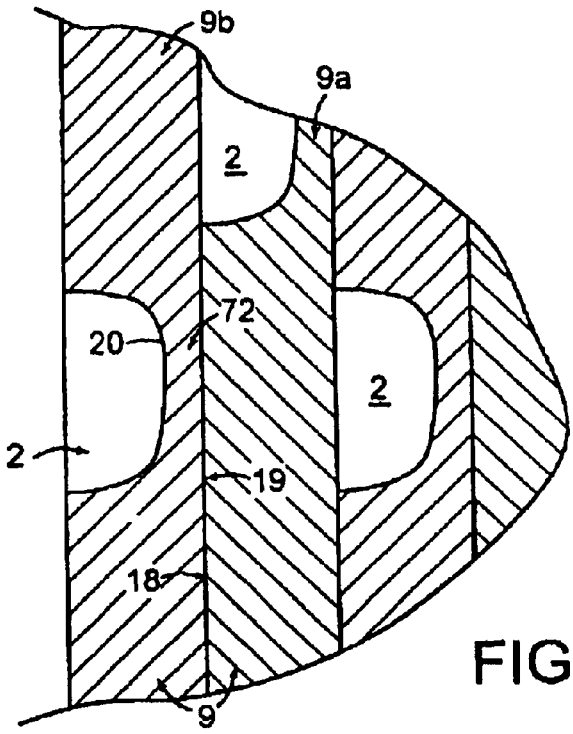
FIG. 4 is an enlarged cross-sectional view, taken along line 4—4 in FIG. 3.

As seen in FIG. 4, in certain circumstances mold cavities 2 are formed such that they do not extend through the entire thickness of a mold ring 9. With the mold cavities thus formed, mold rings 9 are stacked directly against one another, with the open surface 18 of one ring, for instance ring 9a, against the closed surface 19 of the next ring, for instance ring 9b, which forms a side of the mold cavities in ring 9a.

Figure 4A:
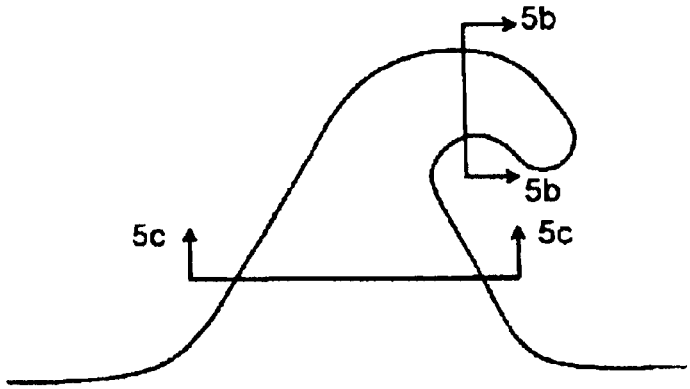
FIGS. 4A through 4C are enlarged views of a preferred embodiment of a hook feature formed by a cavity of the mold roll of FIG. 2.
Figure 4B:
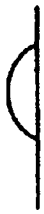
Figure 4C:
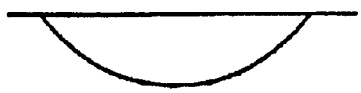

An advantage of forming mold cavities 2 such that they do not extend through the thickness of mold ring 9 is that they may be used to form features with at least one curved side, formed by a concave surface 20. The resulting tapered and convex nature of the hooks, as shown in FIGS. 4A through 4C, can contribute to the penetrability of the hooks into shallow loops, such as presented by non woven fabrics. In the case of extremely small hooks in close rows, the portion 72 of the mold ring that functions as a spacer between rows of hooks adds thickness to the ring and makes it easier to handle during fabrication and assembly.

In other embodiments (not shown), the mold cavities extend through the thickness of the mold rings. In these configurations, spacer rings void of mold cavities are stacked between mold rings to enclose the mold cavities that are otherwise defined in the mold rings. In yet another embodiment, mold cavities are formed on both sides of some mold rings, the array of mold cavities on the two sides of the ring being circumferentially offset to avoid interference between mold cavities on mating rings. In another preferred embodiment a mold cavity for a given feature is formed by accurately aligned cavity portions in two or more mold rings to form a single mold cavity.

Referring to FIG. 5A, in certain preferred embodiments a photochemical (PC) etching process is used to form mold cavities 2, 2', coolant passages 22, and other features, such as an alignment feature (not shown) for aligning adjacent individual mold rings 9 during assembly of mold roll 1. In the embodiment illustrated, mold cavity 2 does not extend through the thickness of mold ring 9, while mold cavity 2' does. In the ring fabrication process, an etch-resistant photoresist material 131 is fixed to the surfaces of a sheet 82 of mold ring material of the proper thickness and then developed by exposure to ultraviolet light through a mask (not shown) that is cut to produce the desired final surface configuration, including preferably the finished inner and outer diameters of the mold ring. The undeveloped photoresist material in areas beneath the mask remains fixed to the sheet as the developed material 131 is removed. Etching fluid 32 is then sprayed on the surfaces of the sheet, etching the areas not covered by etch-resistant material 131. When the etching process is complete, material 131 is removed from the finished mold ring 9. As a natural result of the PC etching process the etching rate is slower at the bottom of the mold cavity, due in part to the dilution of the etching fluid, thus creating a concave surface 20 at the bottom of molding cavity 2, and useful undercuts (not shown) in some arrangements.

In other preferred embodiments, especially those involving large hook elements and other features, the mold cavities are formed with PC techniques by etching through the thickness of the sheet, e.g., as illustrated by cavity 2' of FIG. 5A, either from one side or by etching through both sides.

An advantage of the PC process is that all of the features on a mold ring 9, including the inner and outer diameters, coolant holes 21 and mold cavities 2, 2' can be advantageously produced at the same time or in an appropriate sequence, using precisely positioned masks in accordance with general photo-lithographic techniques, as employed e.g., in the semiconductor industry. In some cases, for instance, one side of a sheet of mold ring stock is appropriately masked to etch all of the features to the depth of the mold cavities 2, and the other side of the sheet is masked by a system that holds registration to complete the etching of the inner and outer diameters and coolant holes 21 through the thickness of mold ring 9.

Referring to FIG. 5B, a laser machining technique is employed in other embodiments to produce mold rings 9 from a sheet 33 of ring stock. Using the laser machining process, hook profiles cut through the thickness of sheet 33 are readily formed, and these can be advantageously of smaller size than those previously formed using wire EDM methods. For instance, hook elements as short as 0.005 to 0.008 inch, with appropriately small radii of 0.001 or 0.002 inch, can be formed. To produce a mold ring by the laser machining process, sheet 33 of the proper thickness is fixtured to be presented to a laser head 34. A beam 35 of energy from laser head 34 removes material from sheet 33, according to a programmed pattern, to produce a finished mold ring. Head 34 is typically mounted on a positionable base, such that the motion of the head can be controlled as desired to form the features of the finished ring. Transverse X-Y motion of a table carrying sheet 33 may also be employed. The depth of the groove produced by the effect of the beam 35 on the sheet 33 is a function of the intensity or power of the beam 35, the material properties of the sheet 33, and the speed at which the head 34 or sheet 33 is moved. Varying these parameters can produce the desired depth of the mold cavities, while also cutting through the entire thickness of the sheet to form the coolant holes 21, the holes 71 for the tie rods, and the ring inner and outer diameters. In the case where a through-cut is not desired, particularly close control of the deposition of laser energy is maintained to limit the vaporization of the ring material to produce, for example, the general cavity shape of FIGS. 4A, 4B and 4C.

Figure 5C:
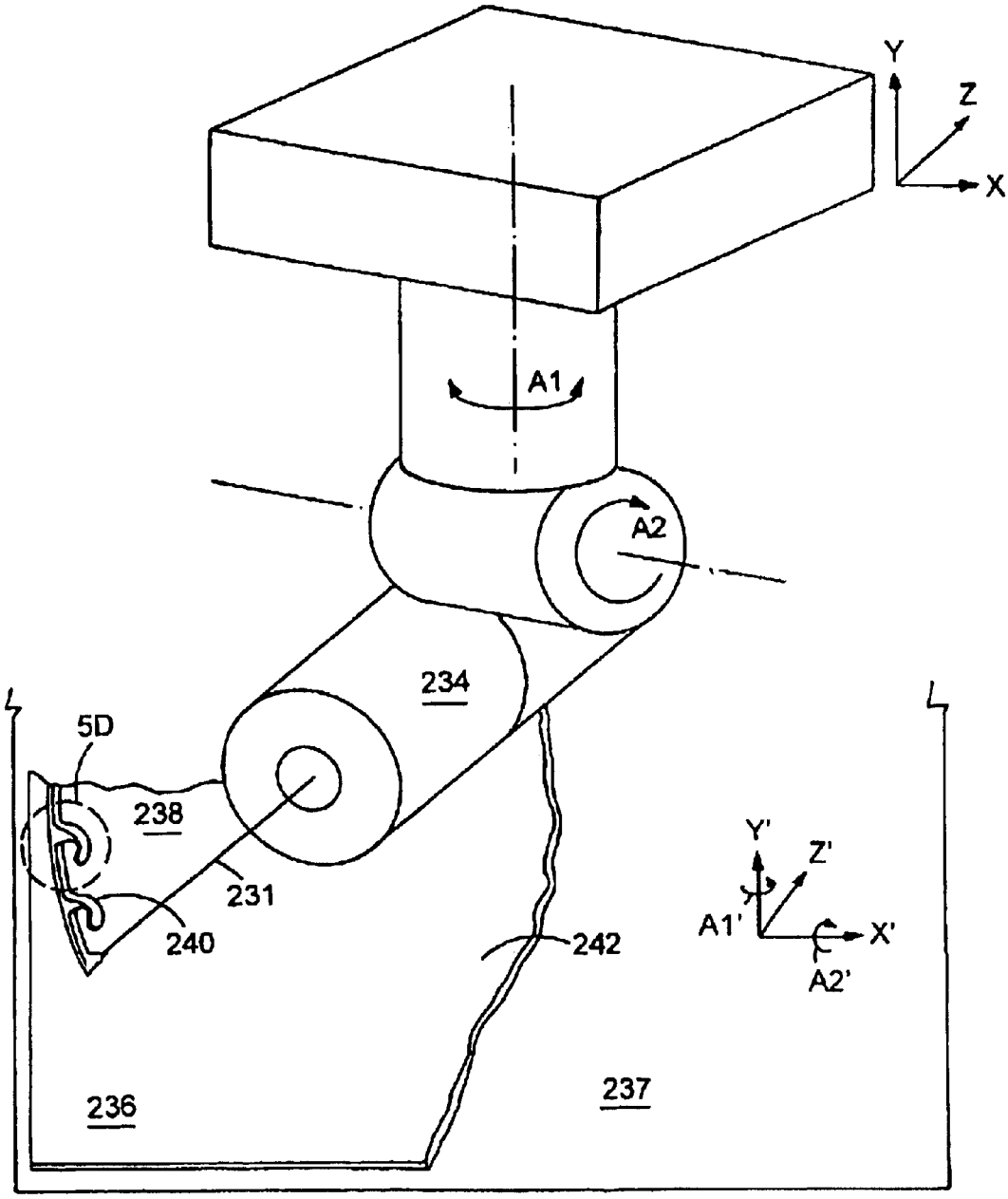

In another embodiment, illustrated in FIG. 5C, laser head 234 is maneuverable by an articulating arm that provides movement about a five-axis (X, Y, Z, A1, A2) orientation of cutting laser beam 231 relative to sheet 236. Movement of head 234 is controlled by a programmable computer (not shown) that positions the head relative to sheet 236 so that emitted beam 231 vaporizes portions of sheet 236 in a controlled manner to produce, e.g., mold ring 238. In an alternative embodiment, laser head 234 is held still while sheet 236 is fixed to an articulating table 237 that provides five-axis (X', Y', Z', A1', A2') motion of sheet 236 relative to laser head 234. In yet other embodiments, both head 234 and sheet fixturing table 237 are maneuverable so that, in combination, they provide relative movement of sheet 236 to head 234 about a five-axis orientation.

Figure 5D:
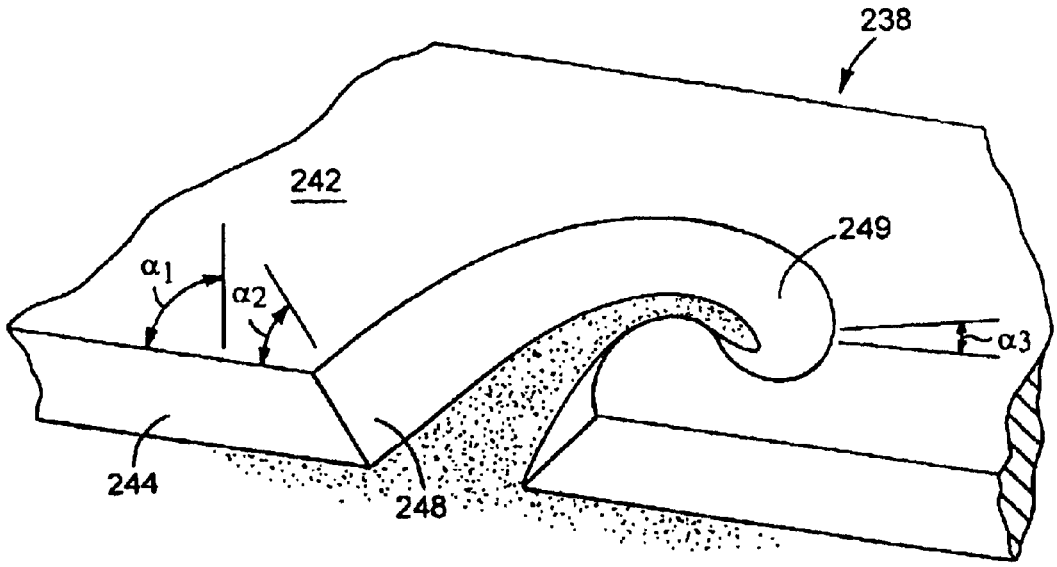
Figure 11:
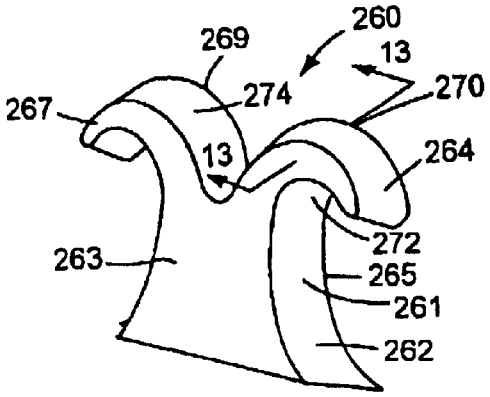
FIGS. 11, 11A, 11B, 12, 12A and 12B are perspective views of alternate embodiments of hook fastener elements.
Figure 12:
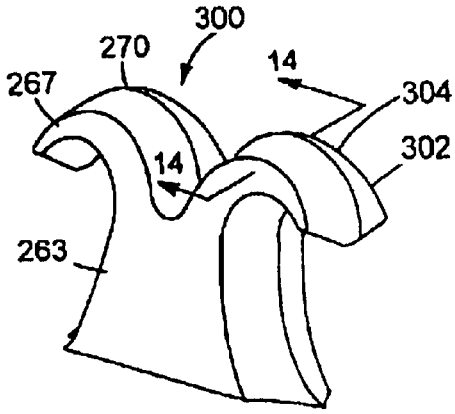

Programmable articulation of head 234 relative to sheet 236 allows for great design flexibility in choosing the shape of a hook-forming cavity 240 formed by emitted beam 231. Particularly, the angle of beam 231 relative to sheet 236 is manipulable to form mold ring features such as peripheral edges, coolant passages, ring alignment holes or features, and/or hook forming cavities having walls angled relative to a plane defined by outer side surface 242 of ring sheet stock 236. Moreover, as illustrated in FIG. 5D, the amount of any such angle can be varied along the path of vaporization of mold ring stock 236. For example, mold ring 238 has a peripheral edge surface 244 that forms a substantially perpendicular angle, $\alpha$1, with side surface 242, while cavity 246 has a hook base-forming portion 248 with an acute cavity wall angle, $\alpha$2, relative to side surface 242 and a hook tip-forming portion 249 with an even more acute wall angle, $\alpha$3 relative to side surface 242. Hook forming cavities having variably angled walls provide advantageous hook shapes as illustrated in FIGS. 10 through 12 and further described below.

Figure 6:
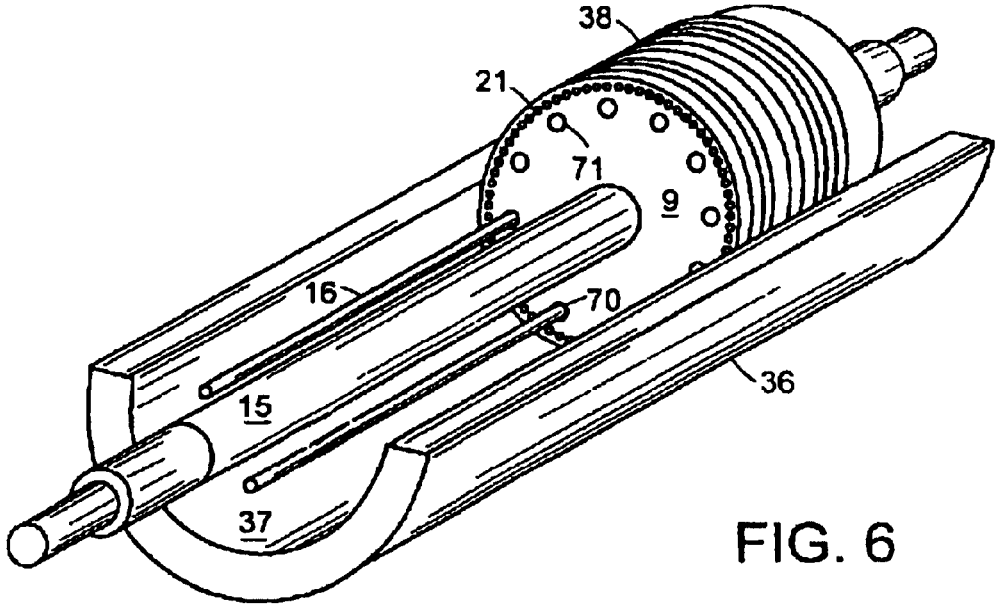
FIG. 6 illustrates a method for aligning and assembling the mold roll.

Referring to FIG. 6, the structure of the mold roll according to the invention enables an improved mold ring alignment method, using a radial alignment shell 36 and one or more orientation bars 37. Preferably, the rings are sequentially stacked about shaft 15 which is concentrically aligned to shell 36 by the inlet and outlet manifolds (i.e., 25) or other means. Tie rods 16 (or other alignment bars inserted through holes 71) align holes 71 as rings 9 are stacked, also aligning coolant holes 21 in each ring to form the cooling passages of the assembled roll. Particularly useful in the assembly of a mold roll for the production of fastener products with good base thickness consistency, the inner surface 37 of shell 36 aligns the outer surface of the rings, such that the assembled roll has a very cylindrical circumference for producing an even base thickness in the molded fastener product. In addition, the stack of rings is concentrically aligned with shaft 15. The gap (70, FIG. 4) between tie rods 16 and the inner edges of holes 71 enables each ring to be radially aligned by surface 37 of shell 36 without radial restraint from tie rods 16. After rings 9 are stacked, the other manifold is set in place and the stack 38 is compressed and removed from alignment shell 36.

In an alternative embodiment (not shown), the rings are aligned with an expandable center shaft.

In molding machines that employ substantially the Fischer process, other systems from that shown in FIG. 1 may introduce pressurized heat softened or molten synthetic resin to the surface of the mold roll under conditions that fill the mold cavities and form a base layer integral with features molded in the cavities. For instance an extruder may be moved closer to the roll from what is shown in FIG. 1 and the extruder nozzle may confine the resin so that it is applied with pressure directly to the mold roll, filling the cavities and forming a base layer of desired thickness. In such a configuration, the structure of the mold roll of the invention can advantageously stiffen and align the roll for improved base thickness consistency, enabling the production of thinner bases, and wider products.

Figure 6A:
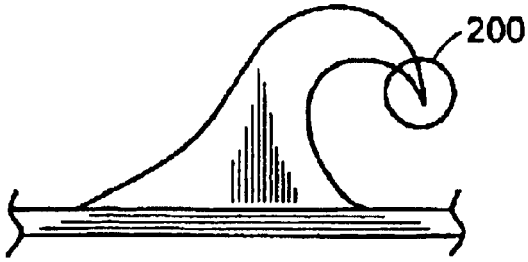
FIG. 6A is a side view of a molded fastener element with a sharp tip.
Figure 6B:
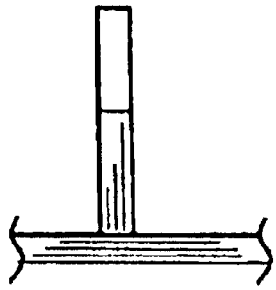
FIG. 6B is a front view of the fastener element of FIG. 6A.
Figure 6C:
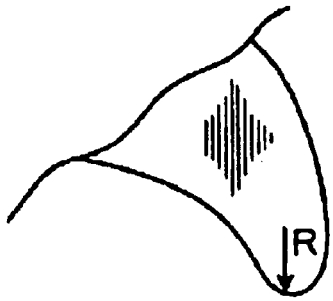
FIG. 6C is a close-up view of area 200 of FIG. 6A.

Shown in FIGS. 6A and 6B is a fine, sharp tip fastener element formed with mold plates fabricated by the laser machining process illustrated in FIG. 5B. Elements with tips having radii, R (FIG. 6C) of about 0.001 inch or less (preferably only about 0.0005 inch), are obtainable with laser-machined molds. Certain advantages are provided by sharp tip fastener elements including penetrability into the loops of engaging loop materials. The sharp tip enables penetration between an engageable loop and the rest of the loop mass of a looped fastener member. Improving the loop-engaging probability of an individual hook of a hook fastener member increases the engagement ratio of an array of hooks, that is, the overall percentage of hooks of the array that, at any given time, engage loops. Higher engagement ratios typically result in better fastener performance.

Figure 7A:
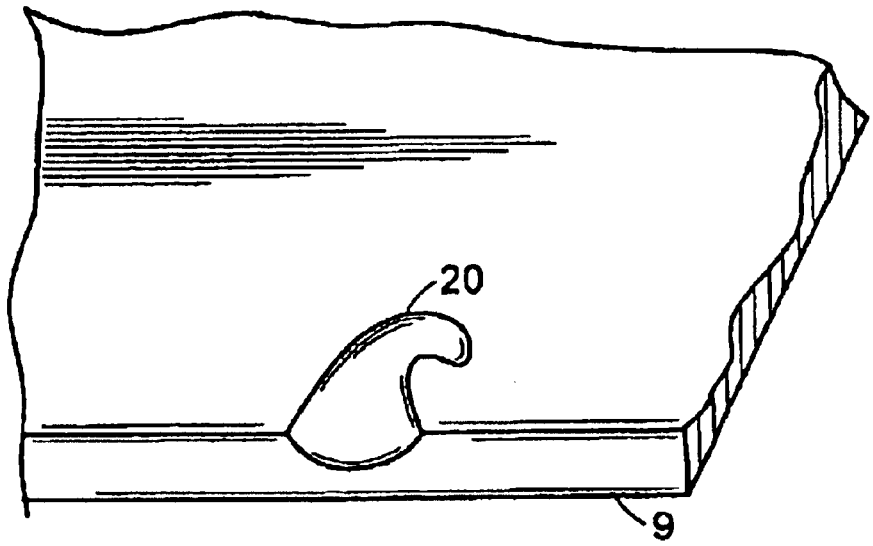
FIG. 7A is a perspective view of a concave mold surface.

As illustrated in FIG. 7A, the laser machining process enables the formation of mold surfaces 20 that do not extend through the entire thickness of mold plate 9.

An advantage of forming mold surfaces that do not extend through the mold plate is that they may be used to form fastener elements with at least one convex surface which may contribute to the penetrability of the elements into shallow loops, such as those presented by non-woven fabrics. In this case, particularly close control of the deposition of laser energy is maintained by appropriate machine controls to limit the vaporization of the plate material to produce, for example, the concave mold surface 20 shown in FIGS. 7A and 7B.

Figure 7B:
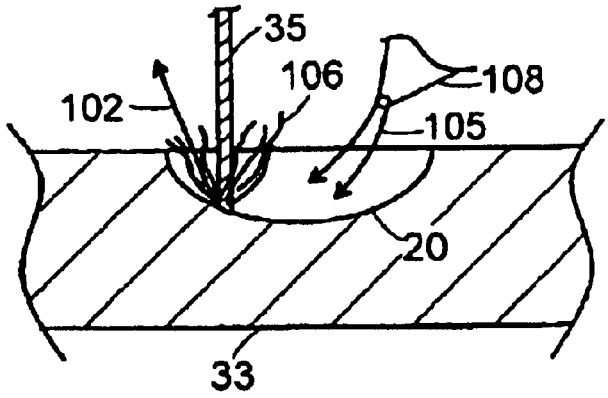
FIG. 7B is a side cross-sectional view of laser machining the mold surface of FIG. 7A.

Referring to FIG. 7B, the depth of the laser cut produced by the effect of beam 35 on sheet 33 is a function of the intensity or power of beam 35, the material properties of sheet 33, and the speed at which the laser head or sheet 33 is moved. Varying these parameters can produce either a concave mold surface of a desired depth (FIG. 7A) or can cut through the entire thickness of the sheet to form mold cavities and/or cooling holes or plate inner and outer diameters. During laser machining of mold surfaces, hot molten debris 106 of plate material is produced. A blower 108 is employed to maintain an air flow 105 sufficient to continually displace debris 106 from the forming area in the general direction indicated by arrow 102. This is especially important when forming concave surfaces not extending through the plate, as in FIG. 7B.

Fastener elements formed with these laser machined surfaces smaller than those previously formed with mold surfaces produced by wire EDM methods. For instance, small fastener elements having an overall height of 0.020 inch, or even smaller elements, for example, having a height of the order of 0.008 inch, are readily produced with cavities formed by this method. Such small hooks can be used for engaging loop materials with low-lying loops as found in non-woven fabrics.

Figure 8A:
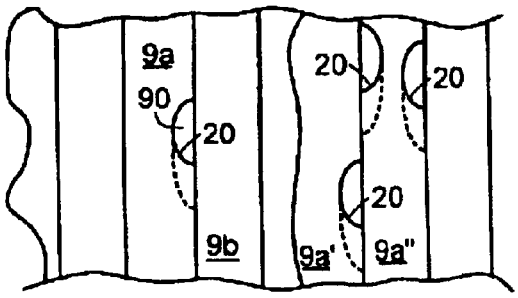
FIG. 8A is an edge view of adjacent mold plates forming a mold cavity with a curved mold surface and an opposing plate side surface.

FIG. 8A shows a mold cavity 90 formed by stacking a mold plate 9a with the laser machined surface 20 of FIG. 7A against the flat side of a spacer plate 9b. Similar cavities are also formed by stacking mold plates 9a' and 9a" together, such that their mold surfaces 20 do not overlap. This arrangement can be used to produce fastener products with particularly high densities.

Figure 8B:
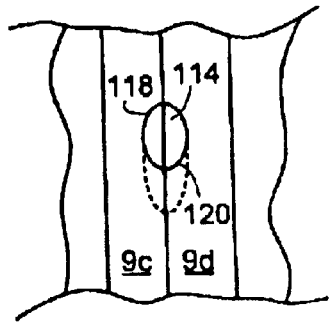
FIG. 8B is an edge view of mold plates forming a mold cavity with two opposing, curved mold surfaces.

In the embodiment shown in FIG. 8B, a mold cavity for a given feature is formed by accurately aligned and cooperating mold surfaces 118 and 120 in two adjacent mold plates 9c and 9d, respectively, to form a single mold cavity 114.

Figure 9:
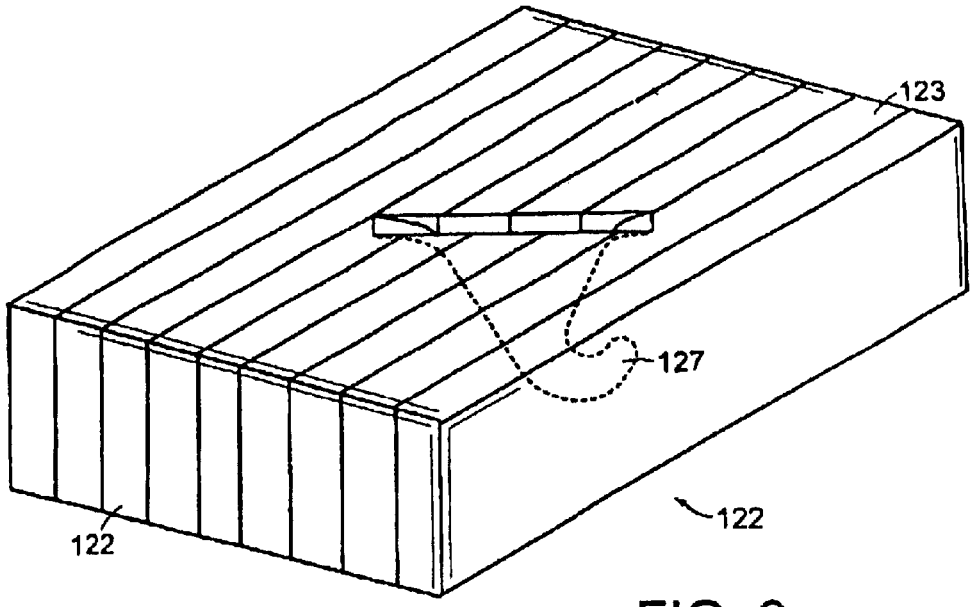
FIG. 9 is a perspective view of an injection mold showing the orientation of a mold cavity diagrammatically.

In FIG. 9, the hook-forming portion of an injection mold 130 for delivering moldable resin to the mold cavities is diagrammatically shown. The moldable resin is injected into adjacent mold cavities 127, thereby forming the fastener elements by injection molding. The injection mold is formed of a series of plates 122 disposed face-to-face to create a flat (or curved) surface 123 having mold cavities. The mold cavities can be formed in one or more plates. After molding, the overall mold opens, the hooks are withdrawn from the mold cavities as the molded piece is removed, and the overall mold closes for another injection cycle. Injection molding can be employed to form the hook members directly on a rigid backing which, in turn, can be attached to a separate part. Injection molding can also be employed to form the hook members integrally with a part, such that the hook members do not need to be later attached to the part.

Figure 10A:
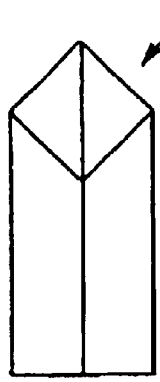
FIG. 10A is a front view of the hook fastener element of FIG. 10.
Figure 10:
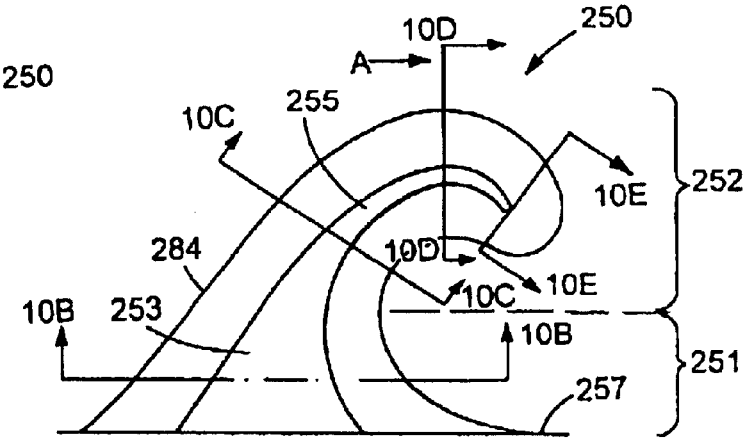
FIG. 10 is a side view of a hook fastener element formed by a mold ring manufactured according to the techniques illustrated in FIGS. 5C and 5D.
Figure 10B:
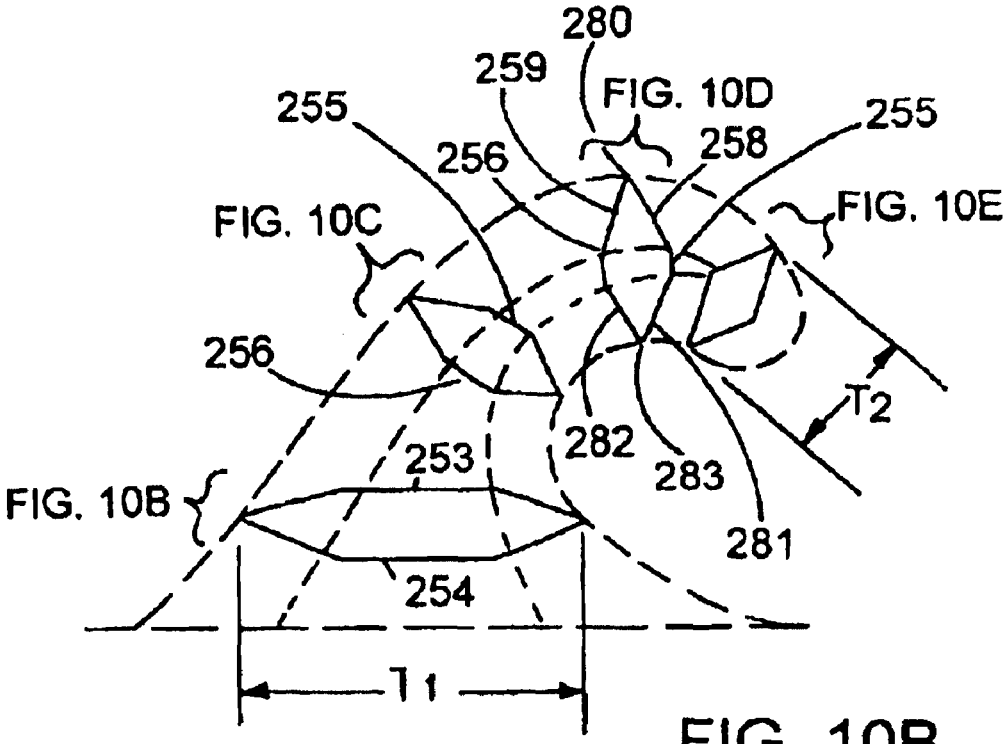

As illustrated in FIGS. 10 through 10D, the laser machining techniques described above with particular reference to FIGS. 5C and 5D can be employed to produce fastener shapes with complex, multi-angled surfaces. In particular, hook 250 has a diamond shaped cross-section that tapers in longitudinal thickness from a stem portion 251 having a relatively thick base (FIG. 10B) with a longitudinal thickness, T1, to a crook portion 252 having a relatively thin hook tip (FIG. 10E) having a longitudinal thickness, T2. Crook portion 252 extends from distal end 284 of stem portion 251 to overhang base 257, thereby defining an overhang direction (indicated by arrow A in FIG. 10). Stem portion 251 has opposite, parallel, planar sides 253, 254 and the crook portion 252 has opposite, parallel, planar sides 255, 256. The first sides 253, 255 of the stem and crook portions are co-planar, as are the second sides 254, 256. As further illustrated by the intermediate cross-section of FIG. 10C, the outer surface transitions smoothly from its thick base to its thin tip.

Referring specifically to FIG. 10D, which illustrates a cross-section of hook 250 taken in a plane perpendicular to both the side 255 of crook portion and the base 257 through an upper most region of crook portion 252, upper surfaces 258, 259 extend upwardly from sides 255, 256, respectively, of crook portion 252 to form an apex 280 while lower surfaces 281, 282 extend downwardly from sides 255, 256, respectively, and intersect with one another to form an underside 283 of crook portion 252.

Hook 250, and other such tapered hooks with angled outer surfaces can be produced, for example, by the techniques illustrated in FIGS. 5C and 5D. Briefly, two mold plates are laser machined so that a partial hook-forming cavity of one mirrors a partial hook-forming cavity of the other. The two mold plates are then placed adjacent one another with their mirror image cavities mating as described above with reference to FIG. 8B, the mating cavities combining to form a single hook-forming cavity.

Figure 11A:
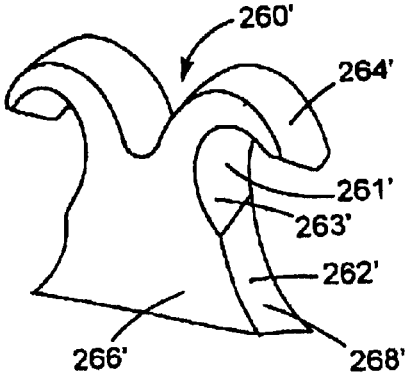
Figure 11B:
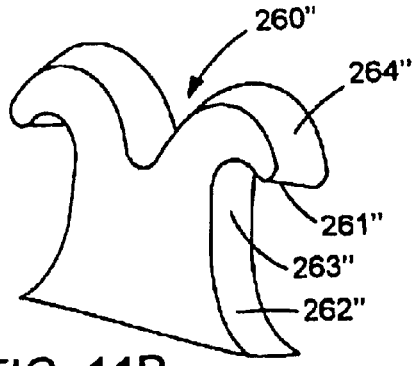

Alternatively, as illustrated in FIGS. 11, 11A and 11B, a non-symmetrical, hook having angled surfaces is formed by a process similar to that described above with reference to FIG. 8A. A mold ring for forming the hook is made by cutting, e.g., with the angled laser approach of FIGS. 5C and 5D, a hook-forming cavity into a single mold ring. The mold ring is then fixtured to partially form a molding roll, such as, for example, roll 1 of FIG. 2, so that the hook-forming cavity of the mold ring is bounded by a flat surface of an adjacent ring or plate. The result is, for example, a multi-headed hook 260 (FIG. 11) having a stem portion 262 with opposite, planar sides 263, 265 and a crook portion 264 also with opposite, planar sides 267, 269. An angled surface 261 extends between sides 263 and 265 of stem portion 262 and between sides 267 and 269 of crook portion 264 along the entire height of hook 260 and defines an underside 272 of crook portion 264. Meanwhile, an upper angled surface 274 extends between sides 267 and 269 of crook portion 264 to an apex 270 of hook 260. The crook portion 264 thus has a flat planar side 267 co-planar with the planar side 263 of the stem portion 262, and an upper surface 274 extending upward from an upper extent of planar side 267 to apex 270, as shown in FIG. 13, with apex 270 being located at side 269 of the crook portion 264.

Figure 13:
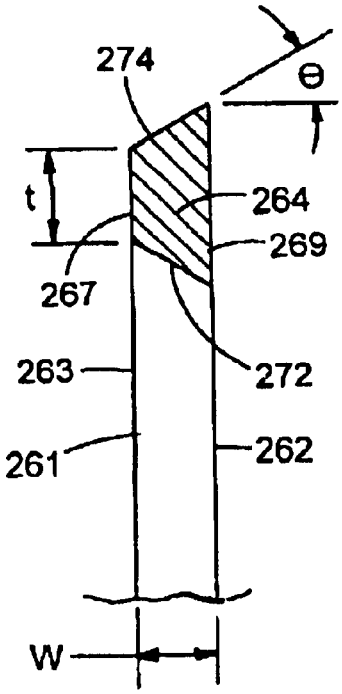
FIG. 13 is a cross-sectional view, taken along line 13—13 in FIG. 11.

FIG. 13 also illustrates that crook portion 264 has a lower surface 272 that, in this cross-section taken perpendicular to the base and the first side surface through an uppermost region of underside 272, extends downward from side surface 267 of the crook portion. As shown in FIG. 13, the width "t" of planar side surface 267 is significant in comparison with (e.g., at least 50% of) the overall width "w" of the fastener element. In some cases, the width of the planar sides of the crook portion is about the same as the width of the fastener element. Upper surface 274 extends upward at a significant angle θ with respect to the base, such as at least about 30 degrees.

As another example, a mold ring is, e.g., laser cut to form a multi-headed hook 260' (FIG. 11A) having an angled surface 261' extending along the crook portion 264' from its tip down to the distal end of 263' of the base portion 262', but the base portion itself has a straight-surface connecting its planar sides, i.e., base portion 262' is defined by side 266' (and an opposite side surface) and opposite edge surfaces 268' (one shown), sides 266' being substantially parallel to and edge surfaces 268' being substantially perpendicular to the broad surface (e.g., surface 242 of FIGS. 5C and 5D) of the mold ring from which hook 260' is formed. In yet another embodiment, a mold ring is, e.g., laser cut to form a multi-headed hook 260" (FIG. 11B) having an angled surface 261" extending only along tip portion 264", while base portion 262" and intermediate portion 263" are defined by substantially straight surfaces.

Figure 12A:
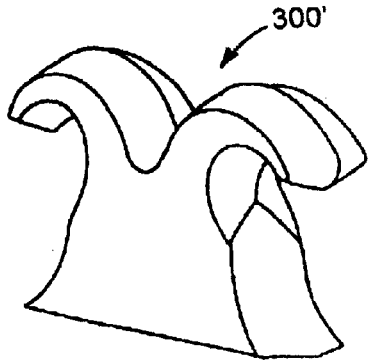
Figure 12B:
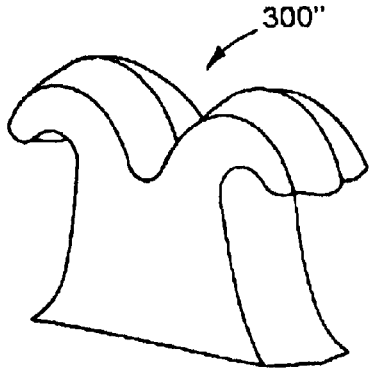

Other complex shapes with varying angled surfaces are also possible. For example, as illustrated in FIGS. 12, 12A and 12B, multi-headed fastener elements having angled surfaces extending along various portions, e.g., the entire height of hook 300 (FIG. 12), the tip and intermediate portions only of hook 300' (FIG. 12A), and the tip portion only of hook 300" (FIG. 12B), are possible. Again, the angled surfaces of the hook are acutely angled relevant to a plane defined by the flat surface of the forming mold ring or plates. In this case, the crook portion 302 also has a second upper surface 304 extending from the second side of the crook portion to apex 270, such that apex 270 is located between the two planar, parallel sides 267 and 306 of the crook portion, as shown in FIG. 14.

Figure 14:
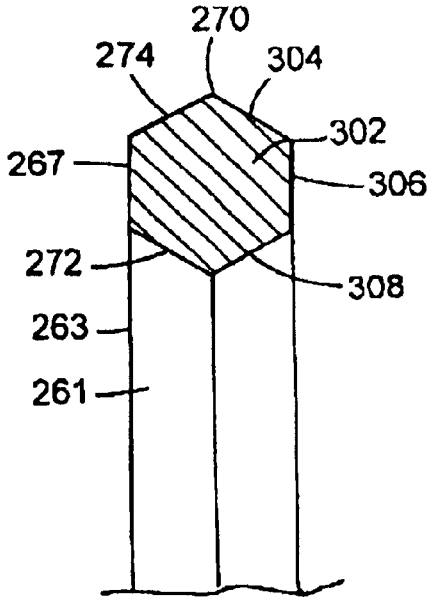
FIG. 14 is a cross-sectional view, taken along line 14—14 in FIG. 12.

FIG. 14 also illustrates that the crook portion 302 also has a second lower surface 308 that, in this cross-section taken perpendicular to the base and side surface 267 through an uppermost region of underside 308 of the crook portion, extends downward from side surface 306 of the crook portion to intersect lower surface 272.

The ability to shape hook-forming cavities with complex angled walls that transition in angle and depth along the path of the cavity provides distinct advantages. For example, having a tapered, angled-surfaced hook tip allows the tip of the hook to engage loop elements of relatively low loft, e.g., certain nonwoven loop materials. Simultaneously, it is advantageous to have a relatively thicker hook base and hook neck portion to provide overall hook strength and durability, and to provide hook resistance to disengagement of engaged loop fibers. The ability to cut hook-forming cavities of complex shape by using laser-machining techniques allows the hook designer to tailor the hook shape to the particular requirements of a given application. Further, the computer-controlled laser cutting of mold plate cavities provides an accurate, repeatable process for producing fastener member tooling.

The moldable resin may be any moldable plastic material depending upon the intended application for the fastener element. Currently, polypropylene is preferred. Nylon, polyesters, polyethylene, propylene, polyethylene and copolymers thereof, or other thermoplastic resins, may also be used.

With laser machining methods, mold surfaces can be cut through the thickness of a mold plate at speeds of up to one circumferential inch per minute. A finished mold plate can typically be machined in less than one hour. In applications when close control of the cavity surface depth is desired, a pulsed laser is preferred.

To provide very smooth surface finishes on laser-machined mold surfaces, such that the solidified hooks are more readily released, the laser-machined mold plates are immersed in a chemical etchant which preferentially removes mold plate material of the microscopic asperities left by the laser-machining process. Finished mold surfaces with a roughness of 63 microinches, for instance, have been found to acceptably release molded fastener elements.

The embodiments are within the scope of the claims. For instance, mold surfaces can be formed on both sides of some mold plates, the array of mold cavities on the two sides of the plate being circumferentially offset to avoid interference between mold cavities on mating plates. Multiple mold plate blanks can also be stacked together, with features extending through the thickness of the plates laser-machined simultaneously through all stacked plates. These and other features and advantages will be understood from the following claims, taken in conjunction with the foregoing specification and accompanying drawings.

A number of embodiments of the invention have been described. Nevertheless, it will be understood that various modifications may be made without departing from the spirit and scope of the invention. For example, individual mold rings can be formed using any combination of the EDM, photochemical etching, and laser machining techniques disclosed herein. Accordingly, other embodiments are within the scope of the following claims.

What is claimed is:

1. A method of forming a mold having cavities for molding loop-engageable, hook-shaped fastener elements, the method comprising:

(a) supporting a first plate having an outer surface that defines a plane, (b) manipulating a relative position of a material-cutting beam of a laser with respect to said first plate along a predetermined curved profile to cut a cavity into said outer surface of said first plate, said predetermined curved profile being generally hook-shaped, the cavity defined by a wall extending into said first plate from said outer surface;

(c) in a series of subsequent actions, repeatedly indexing the first plate relative to the laser to direct the material-cutting beam at further positions on the first plate and repeating the step of manipulating the material-cutting beam of the laser relative to the first plate to form a series of cavities, each having a hook-shaped profile; and (d) positioning a second plate adjacent said outer surface of said first plate, said second plate providing a side wall surface for each of said cavities of said first plate, said first plate and said second plate in combination forming a mold having cavities for molding loop-engageable, hook-shaped fastener elements.

2. The method of claim 1, wherein *said step of* manipulating a relative position of a material-cutting beam *of a laser with respect to said first plate to cut a cavity* comprises [moving the material cutting beam] *positioning the material-cutting beam at an acute angle relative to the plane defined by the upper surface of the first plate to form at least a portion of the wall defining the cavity at a corresponding acute angle relative to said plane*.

3. The method of claim 1 wherein said step of manipulating a relative position of a material-cutting beam of a laser with respect to said first plate to cut a cavity comprises cutting only partially through the first plate, a remaining portion of the first plate providing a second side surface of the cavity, opposite said side surface formed by said second plate.

4. The method of claim 3 further comprising a step of forming a series of cavities on said second plate, the cavities of the second plate being of mirror image relative to the cavities of the first plate, said step of positioning the second plate adjacent said outer surface of said first plate comprising aligning the cavities of said first plate with the cavities of said second plate to form a series of hook-shaped cavities, each having one side surface formed by a remaining portion of said second plate and an opposite side surface formed by a remaining portion of said first plate.

5. The method of claim 3 wherein said second plate has opposite planar surfaces, the method further comprising a step of forming a series of cavities extending into said second plate from one of said opposite planar surfaces, the step of positioning the second plate adjacent said outer surface of said first plate comprising aligning a non-cavitated portion of one of said opposite planar surfaces or said second plate with each of said cavities of said first plate, the second plate providing a planar side wall for such at said cavities of said first plate.

6. The method of claim 1 wherein said step of manipulating a relative position of a metal-cutting beam of a laser with respect to said first plate to cut a cavity comprises cutting completely through the first plate, the wall of the cavity extending from the outer surface of the first plate to an opposite outer surface of the first plate, the method further comprising a step of positioning a third plate adjacent said opposite outer surface of said first plate, said second plate and said third plates defining opposite side surfaces of each of the cavities.

7. The method of claim 1 in which the series of mold cavities is arranged on a circular periphery to define a mold ring.

8. The method of claim 1 wherein manipulating a relative position [or] *of* a material-cutting beam comprises moving the material cutting beam.

9. The method of claim 1 further comprising assembling a plurality of said first and second mold plates in a stack-form to a mold with an exposed outer surface comprising said peripheral edge surface of each mold ring and said series of cavities extending inwardly therefrom.

10. The method of claim 9, wherein said step of assembling said mold plates in a stack-form to provide a molding apparatus further comprises providing an alignment shell defining a circular aligning surface, and at least one aligning bar; and arranging the plates in said stack-form with each plate being supported on an outer circumferential surface by said aligning surface, said aligning bar extending through an aligning hole in each mold plate.

11. The method of claim 10, wherein said step of assembling further comprises axially compressing said stack of plates to maintain the radial alignment provided by said circular aligning surface.

12. The method of claim 11, wherein said step of assembling further comprises removing said aligned stack of rings from said alignment shell.

13. The method of claim 1, wherein said step of manipulating a relative position of a material-cutting beam of a laser includes laser-cutting the outer edges of said mold plates.

14. The method of claim 1, wherein said first plate is between 0.006 to 0.020 inch thick.

15. The method of claim 1, wherein said first plate and said second plate each include a coolant passage, said step of positioning including aligning said coolant passage of the first plate with said coolant passage of said second plate.

16. The method of claim 15, wherein said step of manipulating a relative position of a material-cutting beam of a laser comprises laser cutting said coolant passages.

17. The method of claim 1, wherein said laser is maneuverable by an articulating arm that provides movement about a five-axis orientation relative to said first plate.

18. The method of claim 1, wherein said first plate is fixed to an articulating table that provides five-axis motion relative to said laser.

19. The method of claim 1, wherein said first plate is fixed to an articulating table and both said laser and said articulating table are maneuverable so that, in combination, they provide relative movement of said plate to said laser about a five-axis orientation.

* * * * *